United States Patent Office 2,704,090
Patented Mar. 15, 1955

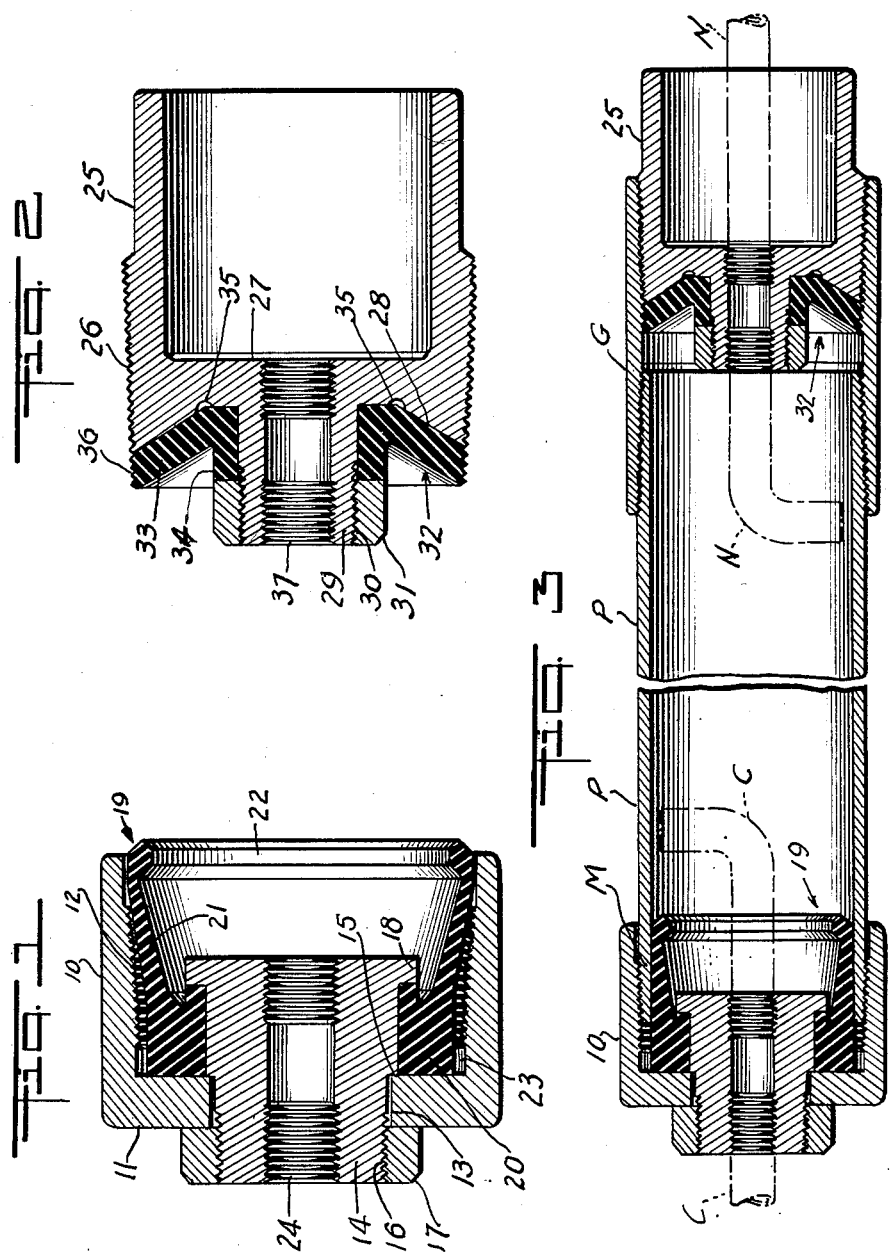

2,704,090

PRESSURE SEALED CLOSURES FOR PIPE ENDS

Ernest L. Potts and Floyd L. Scott, Jr., Houston, Tex., assignors, by mesne assignments, to Cicero C. Brown, Houston, Tex.

Application March 12, 1949, Serial No. 81,132

5 Claims. (Cl. 138—90)

This invention relates to pressure-sealed closures, and particularly to fluid pressure-sealed closures for threaded tubular openings such as pipe ends and the like.

In our co-pending application, Serial No. 79,486, filed March 3, 1949, we have described an organization of apparatus and method for pressure testing vessels such as pipe and the like. As a part of the testing apparatus, we disclosed, but did not claim, novel forms of pressure-sealed closures which are particularly adapted for quick connection to, and removal from, the threaded ends of pipe and similar threaded openings. The present application is directed to such closures, per se, and is, therefore, a continuation-in-part of our afore-mentioned co-pending application.

A principal object of the present invention is to provide improved pressure-sealed closure members for threaded openings.

An important object is to provide a pressure-sealed closure having a threaded metallic body portion forming the primary closure for a threaded opening and carrying a compressible resilient portion expandible by fluid pressure from inside said opening to form a fluid-tight seal for said opening.

Another object is to provide a pressure-sealed closure for internally-threaded tubular openings.

A further object is to provide a pressure-sealed closure for externally threaded tubular openings.

Other and more specific objects and advantages of this invention will become apparent from the following detailed description when read in conjunction with the accompanying drawings which illustrate useful embodiments in accordance with this invention.

In the drawings:

Fig. 1 is a longitudinal sectional view of one form of closure in accordance with this invention, which is adapted particularly for closing an externally threaded, or male, pipe end;

Fig. 2 is a longitudinal sectional view of a form of closure adapted particularly for closing an internally threaded, or female, pipe end; and Fig. 3 is a view showing the closure members of Figs. 1 and 2 mounted on the opposite ends of a pipe.

Referring to the drawings, Fig. 1 illustrates a cap-type closure member for application to an externally threaded or male-type tubular opening and comprises a tubular metallic body 10 having an end wall 11 and provided with internal screw threads 12 extending from the open end of body 10 to a point adjacent the inner face of end wall 11. Threads 12 will, of course, be matched to the threads of the pipe end or other tubular opening over which the closure is to be screwed. End wall 11 is provided with an axial aperture 13 through which a tubular bushing 14 is inserted. Bushing 14 is enlarged at a point intermediate its ends to form an abutment 15 adapted to engage the inner face of end wall 11 adjacent aperture 13 in order to prevent outward withdrawal of the bushing through the aperture. The outer end of bushing 14 is externally threaded at 16 to receive a jam nut 17 which, when screwed down over the threaded end of the bushing, acts to draw the inner end of the bushing toward the inner face of end wall 11. The inner end of bushing 14 is provided with an outwardly extending peripheral flange 18. A cup-shaped sealing element, designated generally by the numeral 19, constructed of rubber or other similar resilient material, is inserted in the bore of body 10, and includes an annular bottom portion 20 which is mounted on bushing 14 and positioned between the inner face of end wall 11 and flange 18 which serves to clamp bottom portion 20 against end wall 11 when jam nut 17 is screwed down over the outer end of bushing 14. Sealing element 19 includes a flexible tubular wall 21 which extends from its juncture with bottom portion 20 toward the open end of body 10 and flares outwardly toward the internally threaded wall of body 10. Wall 21 is made of decreasing thickness toward its outer end to impart correspondingly increasing flexibility thereto. The outer-end of wall 21 is provided with an inwardly turned thickened peripheral lip 22. The external diameter of the sealing element is made generally somewhat less than the internal diameter of body 10 to provide an annular space 23 therebetween. Bushing 14 may be provided, as illustrated, with an internally threaded axial passageway 24, but such passageway is not essential and may be dispensed with if desired.

The left hand end of Fig. 3 illustrates the manner in which the above-described cap-type closure member may be applied to an externally threaded or male-type tubular member, such as the male threaded end M of a pipe P. The threaded end of the pipe is inserted into annular space 24 between sealing element 19 and body 10 and the latter is screwed down in the usual manner over the threads of the pipe end. As body 10 is thus made-up on the pipe end, wall 21 will move inside the bore of the pipe end, and by virtue of its outwardly flaring flexible construction, will be maintained in frictional contact with the inner wall of the pipe end. When fluid pressure is exerted from within the pipe, for example, as by the introduction of a pressure fluid therein through pipe connection C, shown in broken lines in Fig. 3 connected to opposite ends of passageway 24, the pressure will be exerted against the interior of sealing-element 19 and will expand and compress wall 21 tightly against the inner wall of pipe P, thereby forming a fluid-tight seal in the bore of the pipe. The greater the pressure, the tighter will be the seal. When the pressure on sealing element 19 is relieved, the latter will retract to its normal dimensions, thereby releasing its grip on the inner surface of the pipe, and the closure member may then be readily removed by unscrewing body 10.

With the described arrangement, it will be evident that it will not be necessary to make-up body 10 very tightly on the pipe end to assure a good seal for the closure member, since the threaded connection functions primarily merely to hold the closure member in place on the pipe, while the sealing element 19 functions in response to the internally applied pressure to render the closure fluid-tight. Accordingly, it will only be necessary in most instances to make up body 10 merely to hand-tightness on the threads of the pipe end. This will obviate the need for wrenches or other mechanical tightening aids and will be particularly advantageous when it is desirable to employ a closure member which may be quickly applied to, or removed from, an opening but which will be fully fluid-tight under high pressures applied to the closure member from within the opening.

Fig. 2 illustrates another embodiment of this invention which constitutes a plug-type closure member for internally threaded or female-type openings. As illustrated, this form of closure member comprises a tubular metallic body 25 having external metallic threads 26 about one end portion which are adapted to mate with the internal threads of an opening into which the closure member is to be inserted. The threaded end of body 10 is provided with a closure wall 27 having a generally concave outer end face 28 which has a cylindrical boss 29 extending forwardly from the center thereof. The outer end of boss 29 is externally threaded at 30 to receive a nut 31. A sealing element, designated generally by the numeral 32, constructed of rubber or similar resilient material, is comprised of a cup-shaped circular sealing disk 33 shaped to seat snugly against concave end face 28, and a central hollow hub portion 34 by which the sealing element is mounted on boss 29. Nut 31, when screwed down over the threaded end of boss 29, is adapted to bear against the end of hub portion 34 to hold sealing element 32 securely against end face 28. The latter is provided with a circular groove 35 intermediate boss 29 and its outer edge. Groove 35 forms a reservoir into which the resilient material composing sealing element 32 may flow when under pressure to form a fluid-tight seal between sealing element 32 and end wall 28. The peripheral edge of resilient disk 33 is provided with threads 36 which are substantially identical in form with threads 26 to normally form a continuation of the latter, but are, of course, formed of the same resilient material of which disk 33 is constructed. Boss 29 may be provided, as illustrated, with an internally threaded axial passageway 37 but such passageway is not essential and may be dispensed with, if desired.

The right-hand end of Fig. 3 illustrates the manner in which the above-described plug-type closure member may be applied to an internally threaded or female-type opening, such as the internally threaded collar G connected in the usual manner to the male-threaded end of pipe P. The closure member is screwed into the collar threads in the usual manner, flexible threads 36 of sealing element 32 acting in all respects like metal threads 26 in making up the closure into the collar, but will, of course, engage the collar threads in advance of threads 26. The closure member will ordinarily be made up into the collar threads to whatever degree of tightness may be attained solely by hand turning. When fluid pressure is exerted from within pipe P, as for example, by the introduction of a pressure fluid therein through pipe connections N, shown in broken lines in Fig. 3 connected to opposite ends of passageway 37, the pressure will be exerted against the exposed surfaces of sealing member 32 compressing the latter against end face 28 and forcing threads 36 on the edge of disk 33 radially into tight engagement with the collar threads and forming a fluid tight seal therewith. Material composing disk 33 will also be extruded into groove 35 forming a seal therein to prevent leakage of pressure fluid between sealing element 32 and end wall 28. Thus, no pressure fluid may escape either along the threads or at any point between the sealing element and end wall 27. The greater the pressure applied, the tighter will be the resulting seal. When the pressure on sealing element 32 is relieved, the latter will retract to its normal dimensions, thereby releasing the grip of threads 36 on the collar threads, and permitting the closure member to be readily removed by unscrewing body 25.

Just as in the case of the previously described female-type closure member, it will be evident that it will not be necessary to make up body 25 very tightly in the collar threads to assure a good seal for the closure member, since the threaded connection functions primarily merely to hold the closure member in place in the collar, while sealing element 32 functions in response to the internally applied pressures to render the closure fluid-tight.

As described in our co-pending application, mentioned previously, both types of closure members are useable with particular advantage for the pressure testing of pipes. One of each form of closure member may be applied to ends of a pipe joint having male and female threaded opposite ends and pressure fluid for testing the pipe may be introduced through one of the closure members, the other being provided with a connection for relieving the pressure at the completion of the test.

It will be understood that various changes and modifications may be made in the details of the illustrative embodiments within the scope of the appended claims but without departing from the spirit of this invention.

What we claim and desire to secure by Letters Patent is:

1. A testing plug for an internally threaded pipe end, comprising, a generally cylindrical plug body insertible into said pipe end, said plug body comprising a metallic outer end portion and a contiguous inner end portion composed of non-metallic resilient composition material, the peripheries of both said portions being continuously threaded to engage the threads of said pipe end, said inner end portion being expandible by fluid pressure from within said pipe end to form a fluid-tight seal therewith, and means securing said portions together.

2. A testing plug for an internally threaded pipe end, comprising, a generally cylindrical plug body insertible into said pipe end, said plug body comprising a metallic outer end portion and a contiguous inner end portion composed of non-metallic resilient composition material, the peripheries of both said portions being continuously threaded to engage the threads of said pipe end, said inner end portion being expandible by fluid pressure from within said pipe end to form a fluid-tight seal therewith, a circular sealing groove in the end face of said outer portion contiguous to said inner portion, and means securing said portions together.

3. A testing plug for internally threaded pipe end, comprising, a generally cylindrical plug body insertible into said pipe end, said plug body comprising a metallic outer end portion and a contiguous inner end portion composed of non-metallic resilient composition material, the peripheries of both said portions being continuously threaded to engage the threads of said pipe end, said inner portion being expandible by fluid pressure from within said pipe end to form a fluid-tight seal therewith, an axial passageway through said body, and means securing said portions together.

4. A testing plug for an internally threaded pipe end, comprising, an externally threaded plug body adapted to be screwed into said pipe end, a concave inner end face on said body, a generally circular non-metallic resilient sealing element shaped to seat snugly against said end face, and threads integrally formed in the periphery of said sealing element engageable with the threads of said pipe end and expandible into fluid-tight engagement therewith by fluid pressure from within said pipe end, and means securing said sealing element to said body.

5. A testing plug for an internally threaded pipe end, comprising, an externally threaded plug body adapted to be screwed into said pipe end, a concave inner end face on said plug body, an axial boss extending inwardly from said end face, a generally circular non-metallic resilient sealing element shaped to seat snugly against said end face, said sealing element having an axial aperture through which said boss extends, and threads integrally formed in the periphery of said sealing element engageable with the threads of said pipe end and expandible into fluid-tight engagement therewith by fluid pressure from within said pipe end, and means mounted on the boss securing said sealing element to said body.

References Cited in the file of this patent

UNITED STATES PATENTS

| Number | Name | Date |
|---|---|---|
| 967,679 | Shepheard | Aug. 16, 1910 |
| 996,461 | Costa | June 27, 1911 |
| 1,007,828 | Webb | Nov. 7, 1911 |
| 1,526,960 | Brownell | Feb. 17, 1925 |
| 1,844,409 | Rypinski | Feb. 9, 1932 |
| 2,111,312 | Clark | Mar. 15, 1938 |
| 2,133,934 | Ericsson et al. | Oct. 18, 1938 |
| 2,443,145 | Payne | June 8, 1948 |
| 2,526,172 | Sunde | Oct. 17, 1950 |
| 2,546,672 | Le Clair | Mar. 27, 1951 |
| 2,633,739 | Potts et al. | Apr. 7, 1953 |